United States Patent [19]
Shirasaki

[11] Patent Number: 5,999,320
[45] Date of Patent: *Dec. 7, 1999

[54] VIRTUALLY IMAGED PHASED ARRAY AS A WAVELENGTH DEMULTIPLEXER

[75] Inventor: Masataka Shirasaki, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/685,362

[22] Filed: Jul. 24, 1996

[30] Foreign Application Priority Data

Jul. 26, 1995 [JP] Japan .................................... 7-190535

[51] Int. Cl.⁶ .............................. G02B 27/00; H04J 14/02
[52] U.S. Cl. .......................... 359/577; 359/127; 359/629; 359/839; 359/900
[58] Field of Search ...................................... 359/577, 578, 359/583, 584, 587, 615, 114, 127, 131, 618, 629, 634, 636, 637, 639, 579, 839, 856, 857, 900

[56] References Cited

U.S. PATENT DOCUMENTS 4,362,361 12/1982 Campbell et al. ....................... 359/629
5,583,683 12/1996 Scobey ..................................... 359/127

OTHER PUBLICATIONS

W. H. Fincham and M. H. Freeman, OPTICS, Ninth ed., Butterworth (Publishers) Inc., Boston, § § 14.7 & 14.14, Jan. 1980.
M. Shirasaki, Temperature Independent Interferometer For WDM Filters, Paper WeD.1.6 ECOC '96 (European Conference on Optical Communication), Sep. 18, 1996.
M. Shirasaki, Filtering Characteristics of Virtually–Imaged Phased Array, Presented at IPR (Integrated Photonics Research) Topical Meeting Paper IMC3, Apr. 29, 1996, Boston, MA.
M. Shirasaki, Large Angular–Dispersion By Virtually–Imaged Phased–Array (VIPA) and Its Application to Wavelength Demultiplexing, MOC '95, Hiroshima, Oct. 1995.
M. Shirasaki, Large Angular Dispersion by a Virtually Imaged Phased Array and its Application to a Wavelength Demultimplexer, OPTICS LETTERS, vol. 21, No. 5, Mar. 1996.

*Primary Examiner*—Cassandra Spyrou
*Assistant Examiner*—John Juba, Jr.
*Attorney, Agent, or Firm*—Staas & Halsey

[57] ABSTRACT

A virtually imaged phased array, or "wavelength splitter", which receives a wavelength division multiplexed light including at least two carriers and produces a spatially distinguishable output light for each carrier. The virtually imaged phased array includes a transparent material having first and second surfaces thereon. The second surface has a reflectivity which allows a portion of light incident thereon to be transmitted therethrough. The wavelength division multiplexed light is reflected a plurality of times in the transparent material between the first and second surfaces to cause a plurality of lights to be transmitted through the second surface. The plurality of transmitted lights interfere with each other to produce a respective output light for each carrier of the wavelength division multiplexed light. Further, each carrier is at a respective wavelength within a continuous range of wavelengths, and the output light formed for a respective carrier is spatially distinguishable from an output light formed for a carrier having any other wavelength within the continuous range of wavelengths. A method for making the virtually imaged phased array includes the steps of forming reflecting films and a window on a transparent material.

57 Claims, 13 Drawing Sheets

VIRTUALLY IMAGED PHASED ARRAY AS A WAVELENGTH DEMULTIPLEXER

CROSS-REFERENCE TO RELATED APPLICATIONS

This application is based on, and claims priority to, Japanese patent application number 07-190535, filed Jul. 26, 1995, in Japan, and which is incorporated herein by reference.

BACKGROUND OF THE INVENTION

1. Field of the Invention

The present invention relates to a virtually imaged phased array (VIPA), or "wavelength splitter", which receives a wavelength division multiplexed light comprising a plurality of carriers, and splits the wavelength division multiplexed light into a plurality of luminous fluxes which correspond, respectively, to the plurality of carriers and are spatially distinguishable from each other.

2. Description of the Related Art

Wavelength division multiplexing is used in fiber optic communication systems to transfer a relatively large amount of data at a high speed. More specifically, a plurality of carriers, each modulated with information, is combined into a wavelength division multiplexed light. The wavelength division multiplexed light is then transmitted through a single optical fiber to a receiver. The receiver splits the wavelength division multiplexed light into the individual carriers, so that the individual carriers can be detected. In this manner, a communication system can transfer a relatively large amount of data over an optical fiber.

Therefore, the ability of the receiver to accurately split the wavelength division multiplexed light will greatly effect the performance of the communication system. For example, even if a large number of carriers can be combined into a wavelength division multiplexed light, such a wavelength division multiplexed light should not be transmitted if the receiver cannot accurately split the wavelength division multiplexed light. Accordingly, it is desirable for a receiver to include a high-precision wavelength splitter.

FIG. 1 is a diagram illustrating a conventional filter using a multiple-layer interference film, for use as a wavelength splitter. Referring now to FIG. 1, a multiple-layer interference film 20 is formed on a transparent substrate 22. Light 24, which must be parallel light, is incident on film 20 and then repeatedly reflected in film 20. Optical conditions determined by the characteristics of film 20 allow only a light 26 having wavelength $\lambda 2$ to pass therethrough. A light 28, which includes all light not meeting the optical conditions, does not pass through the film 20 and is reflected. Thus, a filter as illustrated in FIG. 1 is useful for splitting a wavelength division multiplexed light which includes only two carriers at different wavelengths, $\lambda 1$ and $\lambda 2$. Unfortunately, such a filter, by itself, cannot separate a wavelength division multiplexed light having more than two carriers.

FIG. 2 is a diagram illustrating a conventional Fabry-Perot interferometer for use as a wavelength splitter. Referring now to FIG. 2, high-reflectance reflecting films 30 and 32 are parallel to each other. Light 34, which must be parallel light, is incident on reflecting film 30 and reflected many times between reflecting films 30 and 32. Light 36 of wavelength $\lambda 2$ that meets passage conditions determined by the characteristics of the Fabry-Perot interferometer passes through reflecting film 32. Light 38 of wavelength $\lambda 1$, which does not meet the passage conditions, is reflected. In this manner, light having two different wavelengths can be split into two different lights corresponding, respectively, to the two different wavelengths. Thus, as with the filter illustrated in FIG. 1, a conventional Fabry-Perot interferometer is useful for splitting a wavelength division multiplexed light which includes only two carriers at different wavelengths, $\lambda 1$ and $\lambda 2$. Unfortunately, such a Fabry-Perot interferometer cannot separate a wavelength division multiplexed light having more than two carriers.

FIG. 3 is a diagram illustrating a conventional Michelson interferometer for use as a wavelength splitter. Referring now to FIG. 3, parallel light 40 is incident on a half mirror 42 and split into a first light 44 and a second light 46 perpendicular to each other. A reflecting mirror 48 reflects first light 44 and a reflecting mirror 50 reflects second light 46. The distance between half mirror 42 and reflecting mirror 48, and the distance between half mirror 42 and reflecting mirror 50 indicate an optical path difference. Light reflected by reflecting mirror 48 is returned to half mirror 42 and interferes with light reflected by reflecting mirror 50 and returned to half mirror 42. As a result, lights 52 and 54 having wavelengths $\lambda 1$ and $\lambda 2$, respectively, are separated from each other. As with the filter illustrated in FIG. 1 and the Fabry-Perot interferometer illustrated in FIG. 2, the Michelson interferometer illustrated in FIG. 3 is useful for splitting a wavelength division multiplexed light which includes only two carriers at different wavelengths, $\lambda 1$ and $\lambda 2$. Unfortunately, such a Michelson interferometer cannot separate a wavelength division multiplexed light having more than two carriers.

It is possible to combine several filters, Fabry-Perot interferometers or Michelson interferometers into a giant array so that additional wavelength carriers can be split from a single wavelength division multiplexed light. However, such an array is expensive, inefficient and creates an undesireably large receiver.

A diffraction grating or an array waveguide grating is often used to split a wavelength division multiplexed light comprising two or more different wavelength carriers.

FIG. 4 is a diagram illustrating a conventional diffraction grating for splitting a wavelength division multiplexed light. Referring now to FIG. 4, a diffraction grating 56 has a concavo-convex surface 58. Parallel light 60 having a plurality of different wavelength carriers is incident on concavo-convex surface 58. The different wavelength carriers are reflected and interfere with each other. As a result, carriers 62, 64 and 66 having different wavelengths are output from diffraction grating 56 at different angles, and are therefore separated from each.

Unfortunately, a diffraction grating outputs the different wavelength carriers at relatively small dispersion angles. As a result, it is difficult for a receiver to accurately receive the various carrier signals split by the diffraction grating. This problem is especially severe with a diffraction grating which splits a wavelength division multiplexed light having a large number of carriers with relatively close wavelengths. In this case, the dispersion angles produced by the diffraction grating will be extremely small.

In addition, a diffraction grating is influenced by the optical polarization of the incident light. Therefore, the polarization of the incident light can affect the performance of the diffraction grating. Also, the concavo-convex surface of a diffraction grating requires complex manufacturing processes to produce an accurate diffraction grating. In addition, a diffraction grating must receive parallel light.

FIG. 5 is a diagram illustrating a conventional array waveguide grating for splitting a wavelength division multiplexed light. Referring now to FIG. 5, light comprising a plurality of different wavelength carriers is received through an entrance 68 and is divided through a number of waveguides 70. An optical exit 72 is at the end of each waveguide 70, so that an output light 74 is produced. Waveguides 70 are different in length from each other, and therefore provide optical paths of different lengths. Therefore, lights passing through waveguides 70 have different phase from each other and thereby interfere each other when they are output through exit 72. This interference causes lights having different wavelengths to be output in different directions.

In an array waveguide grating, the dispersion angle can be adjusted to some extent by properly configuring the waveguides. However, an array waveguide grating is influenced by temperature changes and other environmental factors. Therefore, temperature changes and environmental factors make it difficult to properly adjust the dispersion angle.

SUMMARY OF THE INVENTION

Accordingly, it is an object of the present invention to provide a wavelength splitter having a simple configuration and being capable of simultaneously separating a plurality of carriers from a wavelength division multiplexed light.

It is an additional object of the present invention to provide a wavelength splitter which disperses separated carriers at a relatively large dispersion angle and is resistant to changes in environmental conditions.

Objects of the present invention are achieved by providing an apparatus which receives an input light having a respective wavelength within a continuous range of wavelengths and produces a corresponding output light. The output light is spatially distinguishable (for example, it travels in a different direction) from an output light formed for an input light having any other wavelength within the continuous range of wavelengths.

Objects of the present invention are also achieved by providing an apparatus which receives an input light having a respective wavelength within a continuous range of wavelengths, wherein the apparatus causes multiple reflection of the input light to produce self-interference and thereby form an output light. The output light is spatially distinguishable from an output light formed for an input light having any other wavelength within the continuous range of wavelengths.

The foregoing objects are also achieved by providing an apparatus which includes a transparent material having first and second surfaces thereon. The second surface has a reflectivity which allows a portion of light incident thereon to be transmitted therethrough. An input light is reflected a plurality of times in the transparent material between the first and second surfaces to cause a plurality of lights to be transmitted through the second surface. The plurality of transmitted lights interfere with each other to produce an output light. The input light is at a respective wavelength within a continuous range of wavelengths and the output light is spatially distinguishable from an output light formed for an input light having any other wavelength within the continuous range of wavelengths.

Moreover, objects of the present invention are achieved by providing an apparatus for receiving a wavelength division multiplexed light including at least two carriers. The apparatus produces a spatially distinguishable output light for each carrier. The apparatus includes a transparent material having first and second surfaces thereon. The second surface has a reflectivity which allows a portion of light incident thereon to be transmitted therethrough. The wavelength division multiplexed light is reflected a plurality of times in the transparent material between the first and second surfaces to cause a plurality of lights to be transmitted through the second surface. The plurality of transmitted lights interfere with each other to produce a respective output light for each carrier of the wavelength division multiplexed light. Further, each carrier is at a respective wavelength within a continuous range of wavelengths, and the output light formed for a respective carrier is spatially distinguishable from an output light formed for a carrier having any other wavelength within the continuous range of wavelengths.

Objects of the present invention are also achieved by providing a method for making a wavelength splitter. The method includes the steps of (a) forming a first reflecting film on a first surface of a transparent material; and (b) forming a second reflecting film on a second surface of the transparent material. The first and second films are formed to allow an input light to be reflected a plurality of times in the transparent material between the first and second reflecting films. The second reflecting film has a reflectance which is less than the reflectance of the first reflecting film and allows a portion of the input light to pass therethrough each time the input light reflects off the second reflecting film, to cause a plurality of transmitted lights to pass through the second reflecting film. Further, the first and second reflecting films are positioned so that the plurality of transmitted lights interfere with each other to provide self interference of the input light and thereby form an output light which is spatially distinguishable from an output light formed for an input light having any other wavelength within the continuous range of wavelengths.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
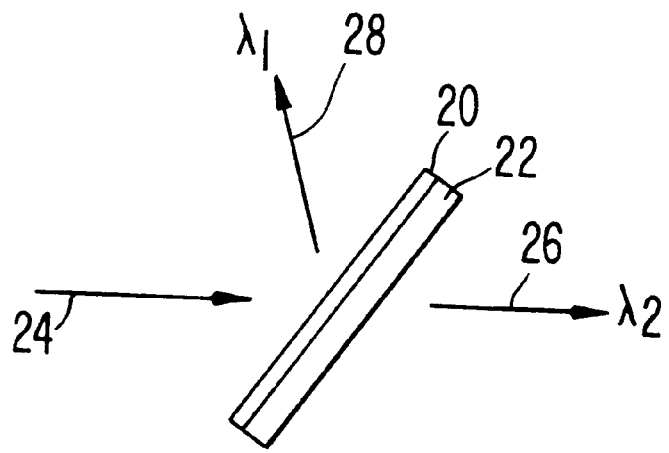
FIG. 1 (prior art) is a diagram illustrating a conventional filter using a multiple-layer interference film.

Reference will now be made in detail to the present preferred embodiments of the present invention, examples of which are illustrated in the accompanying drawings, wherein like reference numerals refer to like elements throughout.

Figure 6:
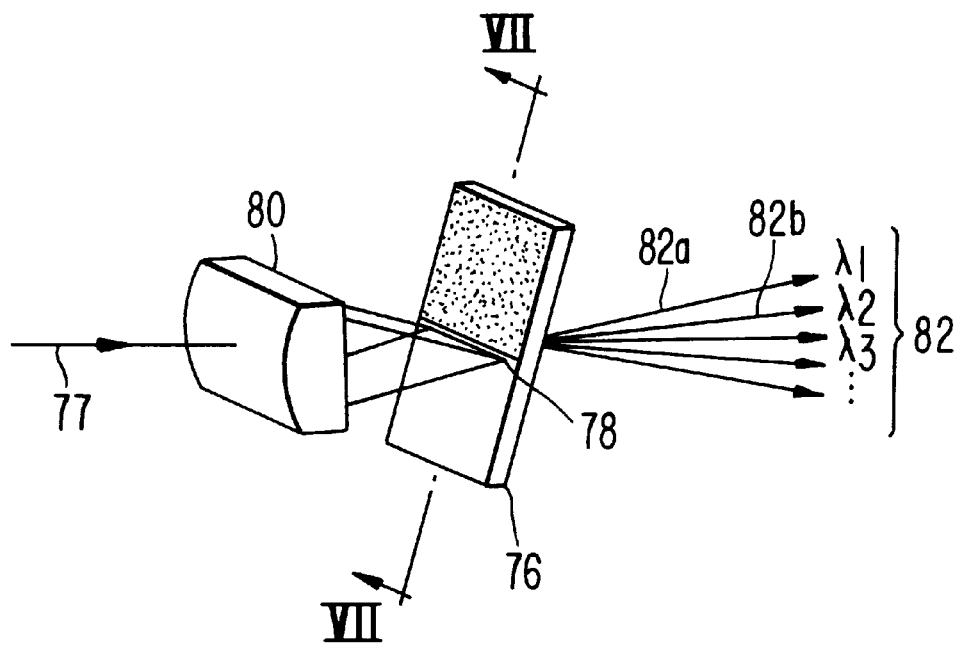
FIG. 6 is a diagram illustrating a wavelength splitter, according to an embodiment of the present invention.

FIG. 6 is a diagram illustrating a wavelength splitter, according to an embodiment of the present invention. Moreover, hereinafter, the terms "wavelength splitter" and "virtually imaged phased array" may be used interchangeably.

Referring now to FIG. 6, a wavelength splitter 76 is preferably made of a thin plate of glass. An input light 77 is focused into a line 78 with a lens 80, such as a semicylindrical lens, so that input light 77 travels into wavelength splitter 76. Line 78 is hereinafter referred to as "focal line 78". Input light 77 radially propagates from focal line 78 to be received inside wavelength splitter 76. Wavelength splitter 78 then outputs a luminous flux 82 of collimated light, where the output angle of luminous flux 82 varies as the wavelength of input light 77 changes. For example, when input light 77 is at a wavelength λ1, wavelength splitter 76 outputs a luminous flux 82a at wavelength λ1 in a specific direction. When input light 77 is at a wavelength λ2, wavelength splitter 76 outputs a luminous flux 82b at wavelength λ2 in a different direction. If input light 77 is a wavelength division multiplexed light which combines light at wavelength λ1 and light at wavelength λ1, then wavelength splitter 76 simultaneously outputs two separate luminous fluxes 82a and 82b in different directions. Therefore, wavelength splitter 76 produces luminous fluxes 82a and 82b which are spatially distinguishable from each other. In this manner, wavelength splitter 76 can simultaneously separate two or more different carrier lights from a wavelength division multiplexed light.

Figure 7:
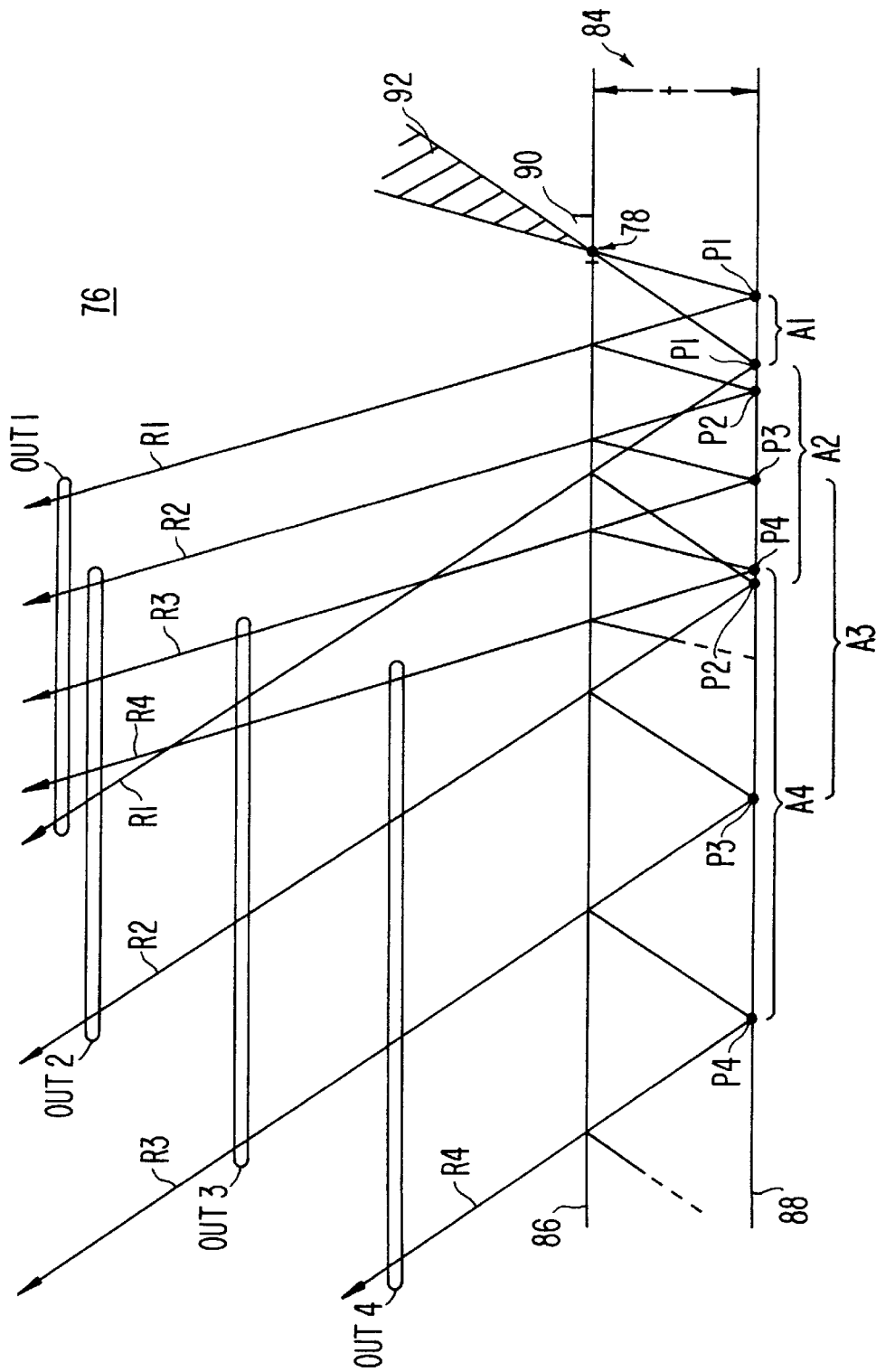
FIG. 7 is a diagram illustrating a cross-section along lines VII—VII of the wavelength splitter illustrated in FIG. 6, according to embodiment of the present invention.

FIG. 7 is a diagram illustrating a cross-section along lines VII—VII of wavelength splitter 76 illustrated in FIG. 6, according to embodiment of the present invention. Referring now to FIG. 7, wavelength splitter 76 comprises a material 84, such as glass, having reflecting surfaces 86 and 88 thereon. Reflecting surfaces 86 and 88 are in parallel with each other and spaced by an interval t. Reflecting surfaces 86 and 88 are typically reflecting films deposited on material 84. Reflecting surface 88 has a reflectance of approximately 100%, and reflecting surface 86 has a reflectance of approximately 95%. Therefore, reflecting surface 86 has a transmittance of approximately 5% so that approximately 5% of light incident on reflecting surface 86 will be transmitted therethrough and approximately 95% of the light will be reflected. However, the reflectances of reflecting surfaces 86 and 88 are not intended to be limited to 95% and 100%, respectively. Instead, the reflectances can be easily changed in accordance with the specific wavelength splitter application. However, generally, reflecting surface 86 should have a reflectance which is less than 100% so that a portion of incident light can be transmitted therethrough.

Reflecting surface 86 has a radiation window 90 thereon. Radiation window 90 allows light to pass therethrough, and preferably has no reflectance, or a very low reflectance. Radiation window 90 receives input light 92 to allow input light 92 to be received between, and reflected between, reflecting surfaces 86 and 88. Radiation window 90 is not always required, and instead, for example, it may be possible to transmit input light 92 directly through reflecting surface 86 to be reflected between reflecting surfaces 86 and 88. However, input light 92 will experience significant loss in such a situation before being reflected between reflecting surfaces 86 and 88. Therefore, it is preferable to use radiation window 90 to receive input light 92.

Since FIG. 7 represents a cross-section along lines VII—VII of FIG. 6, focal line 78 in FIG. 6 appears as a "point" in FIG. 7. Input light 92 then propagates radially from focal line 78. Moreover, as illustrated in FIG. 7, focal line 78 is positioned in radiation window 90. Although it is not required for focal line 78 to be on the surface of radiation window 90, a shift in the positioning of focal line 78 may cause small changes in the splitting characteristics of wavelength splitter 76. Generally, focal line 78 will actually be positioned between radiation window 90 and reflecting surface 88.

As illustrated in FIG. 7, input light 92 collected on focal line 78 travels radially from focal line 78, and reaches reflecting surface 88. Input light 92 covers area A1 on reflecting surface 88 and is then reflected by reflecting surface 88. Points P1 indicate peripheral points of area A1.

After reflecting off area A1 on reflecting surface 88, input light 92 travels to reflecting surface 86. Since reflecting surface 86 has less than 100% reflectance, input light 92 reflected from area A1 is partially transmitted through reflecting surface 86 and output to an external area as output light Out1 defined by rays R1.

Due to the reflectivity of reflecting surface 86, approximately 95% of input light 92 reflected from area A1 is reflected by reflecting surface 86 and is incident on area A2 of reflecting surface 88. Points P2 indicate peripheral points of area A2. After reflecting off area A2 on reflecting surface 88, input light 92 travels to reflecting surface 86 and is partially transmitted through reflecting surface 86 as output light Out2 defined by rays R2. In this manner, as illustrated in FIG. 7, input light 92 experiences multiple reflections between reflecting surfaces 86 and 88, wherein each reflection off of reflecting surface 86 also results in a respective output light (such as output lights Out1 and Out2) to be transmitted therethrough. Therefore, for example, input light 92 reflects off of areas A3 and A4 to produce output lights Out3 and Out4. Points P3 indicate peripheral points of area A3, and points P4 indicate peripheral points of area A4. Output light Out3 is defined by rays R3 and output light Out4 is defined by rays R4. Although FIG. 7 only illustrates output Out1, Out2, Out3 and Out4, there will actually be many more output lights, depending on the power on input light 92 and the reflectances of reflecting surfaces 86 and 88.

As illustrated in FIG. 7, each subsequent output light has a greater width than the previous output light. For example, output light Out3 has a greater width than output light Out2, and output light Out2 has a greater width than output light Out1. Output lights Out1, Out2, Out3 and Out4 interfere with each other and form a luminous flux. The direction of the luminous flux changes in accordance with the wavelength of input light 92.

FIG. 7 illustrates an example of input light 92 comprising one wavelength. However, if the input light comprises a plurality of wavelengths (such as a wavelength division multiplexed light comprising a plurality of carriers, each at a different wavelength), the input light will be reflected in the same manner. However, a plurality of luminous fluxes will be formed corresponding, respectively, to the plurality of carriers. Each luminous flux will be output from the wavelength splitter at a different angle than the other luminous fluxes.

Figure 8:
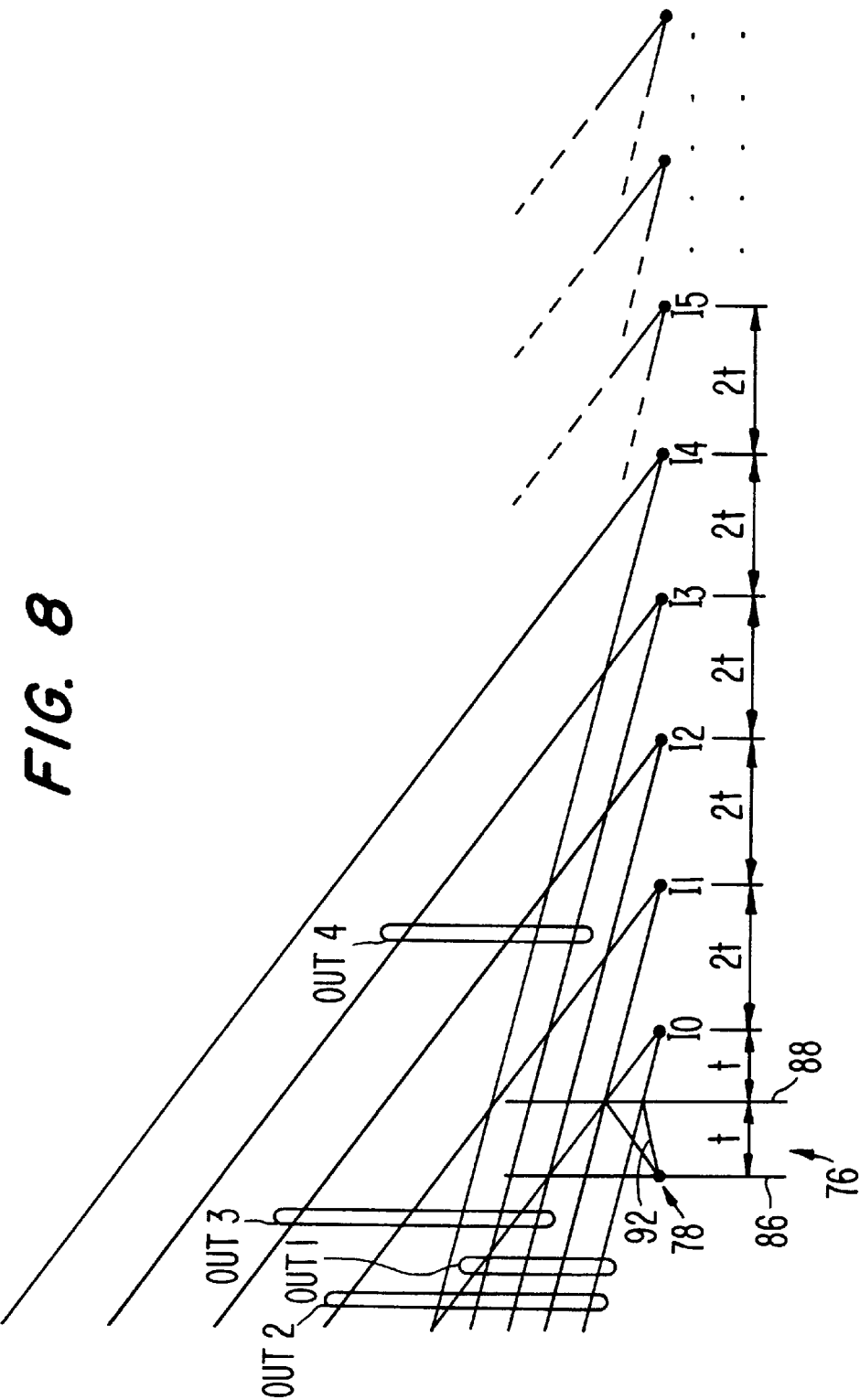
FIG. 8 is a diagram illustrating interference between reflections produced by a wavelength splitter, according to an embodiment of the present invention.

FIG. 8 is a diagram illustrating interference between reflections produced by a wavelength splitter, according to an embodiment of the present invention. Referring now to FIG. 8, light travelling from focal line 78 is reflected by reflecting surface 88. As previously described, reflecting surface 88 has a reflectance of approximately 100% and, therefore, functions essentially as a mirror. As a result, output light Out1 can be optically analyzed as if reflecting surfaces 86 and 88 did not exist and, instead, output light Out1 was emitted from a focal line $I_0$. Similarly, output lights Out2, Out3 and Out4 can be optically analyzed as if they were emitted from focal lines $I_1$, $I_2$ and $I_3$, respectively.

Therefore, focal line $I_1$ represents output light Out2 formed by reflecting input light 92 from reflecting surface 88 to reflecting surface 86, and again to reflecting surface 88. In addition, as illustrated in FIG. 8, focal line $I_1$ is a distance 2t from focal line $I_0$, where t equals the distance between reflecting surfaces 86 and 88. Similarly, each subsequent focal line is a distance 2t from the immediately preceding focal line. Thus, focal line $I_2$ is a distance 2t from focal line $I_1$. Moreover, each subsequent multiple reflection between reflecting surfaces 86 and 88 produces an output light which is weaker in intensity than the previous output light. Therefore, output light Out2 is weaker in intensity than output light Out1.

As illustrated in FIG. 8, output lights from the focal lines overlap and interfere with each other. This interference produces a luminous flux which travels is a specific direction depending on the wavelength of input light 92.

A wavelength splitter according to the above embodiments of the present invention has strengthening conditions which are characteristics of the design of the wavelength splitter. The strengthening conditions increase the interference of the output lights so that a luminous flux is formed. The strengthening conditions of the wavelength splitter are represented by the following Equation (1):

$$2t \times \cos \theta = m\lambda$$

where θ indicates the propagation direction of the resulting luminous flux as measured from a line perpendicular to the surface of reflecting surfaces 86 and 88. λ indicates the wavelength of the input light, t indicates the distance between the reflecting surfaces 86 and 88, and m indicates an integer.

Therefore, if t and λ are constant and m is assigned a specific value, then the prorogation direction θ of the luminous flux formed for input light having wavelength λ can be determined.

More specifically, input light is radially dispersed from focal line 78 through a specific angle. Therefore, input light having the same wavelength will be travelling in many different direction from focal line 78, to be reflected between reflecting surfaces 86 and 88. The strengthening conditions of the wavelength splitter cause light travelling in a specific direction to be strengthened through interference of the output lights to form a luminous flux having a direction corresponding to the wavelength of the input light. Light travelling in different direction than the specific direction required by the strengthening condition will be weakened by the interference of the output lights.

Moreover, if the input light includes light having a plurality of different wavelengths, the strengthening conditions will cause a different luminous flux to be formed for each wavelength in the input light. Each luminous flux will be at a different wavelength. Therefore, the wavelength splitter can receive a wavelength division multiplexed light and produce a plurality of luminous fluxes travelling in different directions and corresponding to the various wavelengths in the wavelength division multiplexed light.

Figure 9:
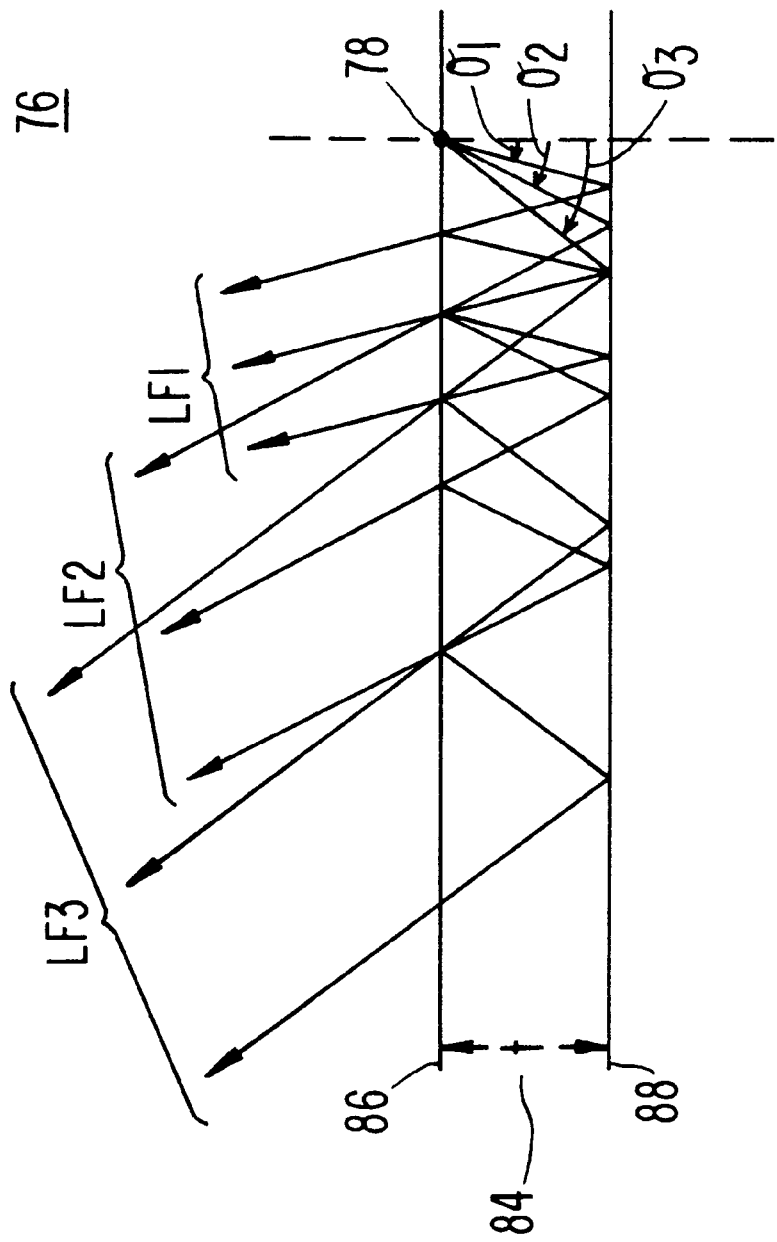
FIG. 9 is a diagram illustrating a cross-section along lines VII—VII of the wavelength splitter illustrated in FIG. 6, to show the formation of a luminous flux, according to an embodiment of the present invention.

FIG. 9 is a diagram illustrating the formation of a luminous flux by wavelength splitter 76, according to an embodiment of the present invention, and represents a cross-section along lines VII in FIG. 6. More specifically, FIG. 9 illustrates that wavelength splitter 76 can form a plurality of luminous fluxes, where each luminous flux has a different propagation direction depending on the wavelength of the input light.

Referring now to FIG. 9, input light having a plurality of wavelengths is radially dispersed from focal line 78 so that the light is reflected between reflecting surfaces 86 and 88. Assume that the input light includes light having three different wavelengths. Therefore, light having each wavelength will be dispersed in many different direction from focal line 78. The strengthening conditions of wavelength splitter 76 cause light of the same wavelength and travelling in a specific direction to be strengthened by light travelling in different directions, to form a luminous flux having a direction corresponding to the wavelength of the input light. Therefore, for example, light having a wavelength λ1 and propagating in the direction θ1 from focal line 78 will be strengthened by light travelling in different directions and will form a luminous flux LF1 having a prorogation direction θ1. Similarly, light having a wavelength λ2 and propagating in the direction θ2 from focal line 78 will be strengthened by light travelling in different directions and will form a luminous flux LF2 having a prorogation direction θ2. Also, light having a wavelength λ3 and propagating in the direction θ3 from focal line 78 will be strengthened by light travelling in different directions and will form a luminous flux LF3 having a prorogation direction θ3.

As described above, Equation (1) should be satisfied to increase the interference among output lights forming a luminous flux. Moreover, the thickness t of material 84 is preferably fixed. Therefore, the angle range of incidence of input light should be set so that input light will enter wavelength splitter 76 with a propagation direction θ which will satisfy Equation (1). More specifically, the propagation direction of input light can be fixed, the distance t between reflecting surfaces 86 and 88 can be fixed, and the wavelength of input light can be determined in advance. Therefore, the specific angle of the luminous flux produced for each wavelength in the input light can be determined, and the strengthening conditions of wavelength splitter 76 can be satisfied.

Moreover, since input light radiates from the focal line 78 in many different direction, it can be assured that input light will propagate at an angle which satisfies the strengthening conditions.

Figure 10:
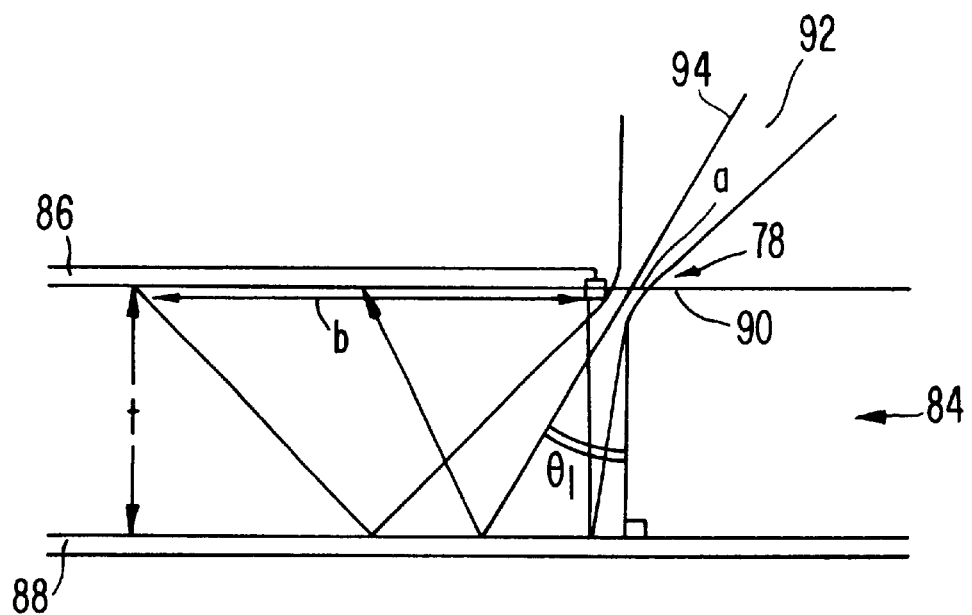
FIG. 10 is a diagram illustrating a cross-section along lines VII—VII of the wavelength splitter illustrated in FIG. 6, showing characteristics of a wavelength splitter for determining the tilt angle of input light, according to an embodiment of the present invention.

FIG. 10 is a diagram illustrating a cross-section along lines VII—VII of the wavelength splitter illustrated in FIG. 6, showing characteristics of a wavelength splitter for determining the angle of incidence, or tilt angle, of input light, according to an embodiment of the present invention.

Referring now to FIG. 10, input light 92 is collected by a cylindrical lens (not illustrated) and focused at focal line 78. As illustrated in FIG. 10, focal line 78 covers an area having a width equal to "a" on reflecting surface 86. "a" is approximately equal to the diffraction limited value. After input light 92 is reflected one time from reflecting surface 88, input light 92 is incident on reflecting surface 86 and covers an area having a width equal to "b" on reflecting surface 86. Moreover, as illustrated in FIG. 10, input light 92 travels along an optical axis 94 which is at a tilt angle θ1 with respect to the normal to reflecting surface 86.

The tilt angle θ1 should be set to prevent input light 92 from travelling out of radiation window 90 after being reflected the first time by reflecting surface 88. In other words, the tilt angle θ1 should be set so that input light 92 remains "trapped" between reflecting surfaces 86 and 88 and does not escape through radiation window 90. Therefore, to prevent input light 92 from travelling out of radiation window 90, the tilt angle θ1 should be set in accordance with the following Equation (2):

tilt of optical axis θ1 ≧ (a+b)/4t

Therefore, as illustrated by FIGS. 6–10, embodiments of the present invention include a wavelength splitter which receives an input light having a respective wavelength within a continuous range of wavelengths. The wavelength splitter causes multiple reflection of the input light to produce self-interference and thereby form an output light. The output light is spatially distinguishable from an output light formed for an input light having any other wavelength within the continuous range of wavelengths. For example, FIG. 7 illustrates an input light 92 which experiences multiple reflection between reflecting surfaces 86 and 88. This multiple reflection produces a plurality of output lights Out1, Out2, Out3 and Out 4 which interfere with each other to produce a luminous flux (such as luminous flux LF1, LF2 or LF3 illustrated in FIG. 9).

"Self-interference" is a term indicating that interference occurs between a plurality of lights or beams which all originate from the same source. Therefore, the interference of output lights Out1, Out2, Out3 and Out4 is referred to as self-interference of the input light 92, since output lights Out1, Out2, Out3 and Out4 all originate from the same source (that is, input light 92).

According to the above embodiments of the present invention, an input light can be at any wavelength within a continuous range of wavelengths. Thus, the input light is not limited to being a wavelength which is a value chosen from a range of discrete values. For example, if a continuous range of wavelengths includes two discrete values, the input light can be at a wavelength which is a value that is between the two discrete values.

Figure 2:
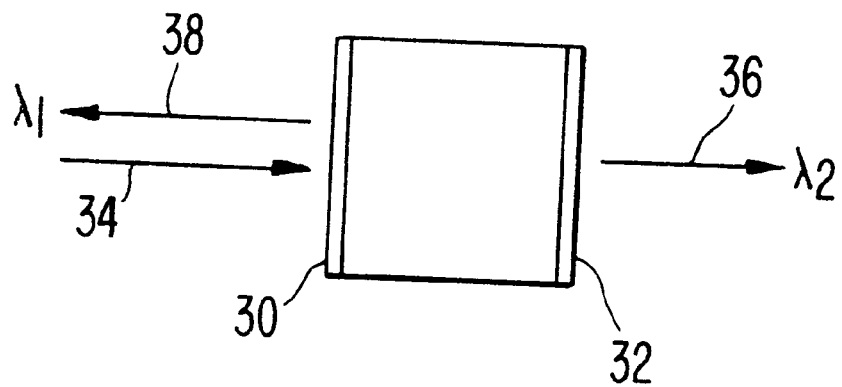
FIG. 2 (prior art) is a diagram illustrating a conventional Fabry-Perot interferometer.
Figure 3:
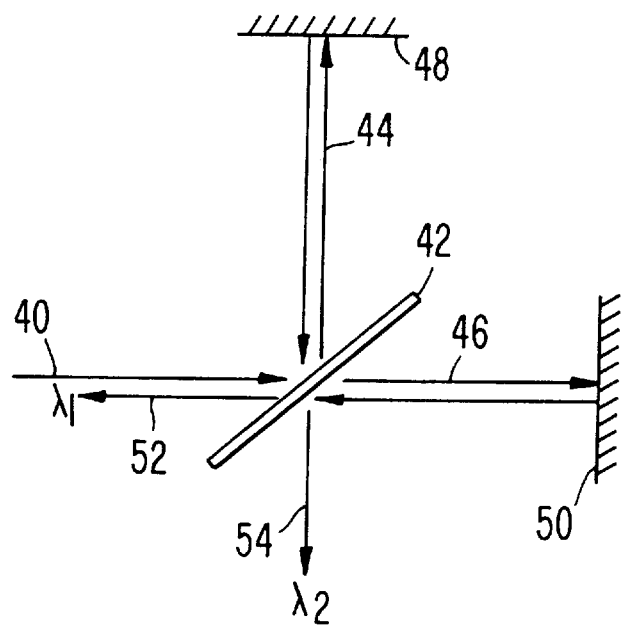
FIG. 3 (prior art) is a diagram illustrating a conventional Michelson interferometer.
Figure 4:
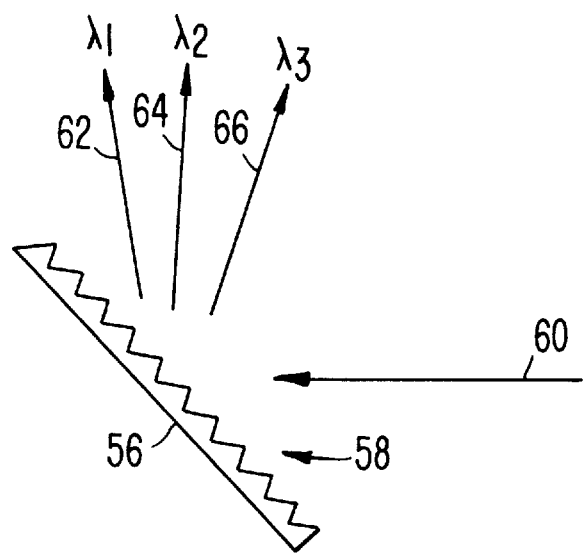
FIG. 4 (prior art) is a diagram illustrating a conventional diffraction grating.
Figure 5:
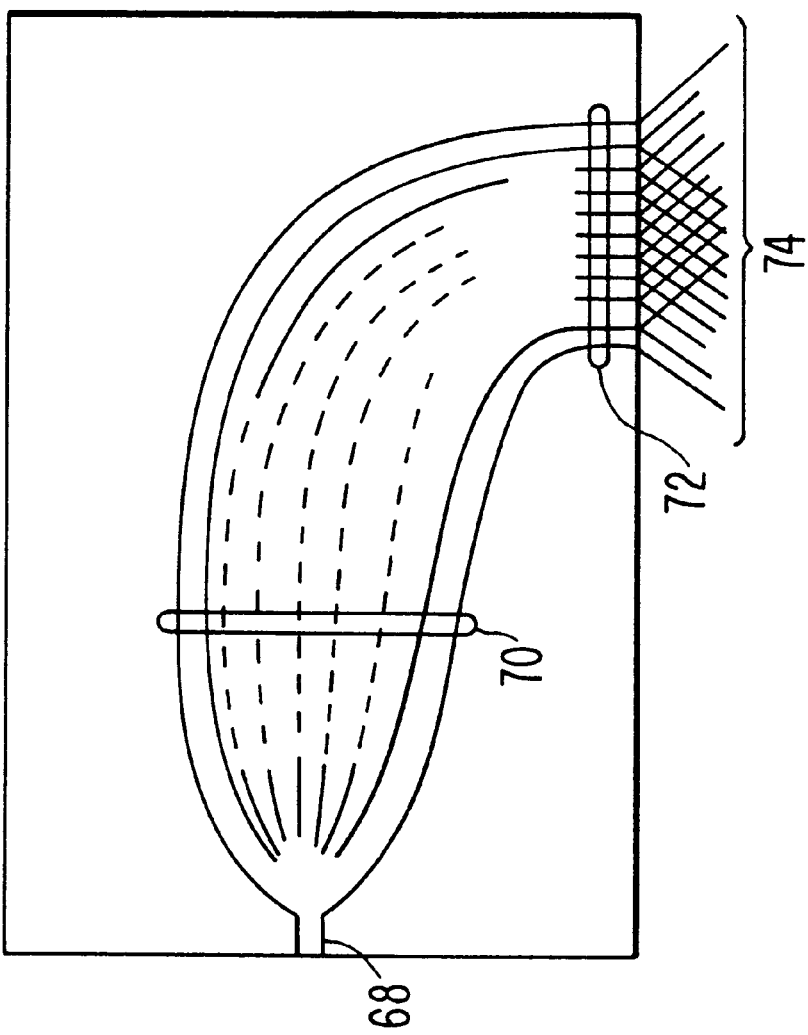
FIG. 5 (prior art) is a diagram illustrating a conventional array waveguide grating for splitting a wavelength division multiplexed light.

In addition, according to the above embodiments of the present invention, the output light produced for an input light at a specific wavelength within a continuous range of wavelengths is spatially distinguishable from an output light which would have been produced if the input light was at a different wavelength within the continuous range of wavelengths. Therefore, as illustrated, for example, in FIG. 6, the travelling direction (that is, a "spatial characteristic") of the luminous flux 82 is different when input light 77 is at different wavelengths within a continuous range of wavelengths. This operation can be compared to conventional wavelength splitting devices illustrated in FIGS. 1–3, where an output light is spatially distinguishable for two different wavelengths of the input light, but cannot produce a spatially distinguishable output light for each wavelength within a continuous range of wavelengths of the input light. For example, in the filter illustrated in FIG. 1, all carriers in a wavelength division multiplexed light which do not have the wavelength λ2 will be output as light 28.

Figure 11:
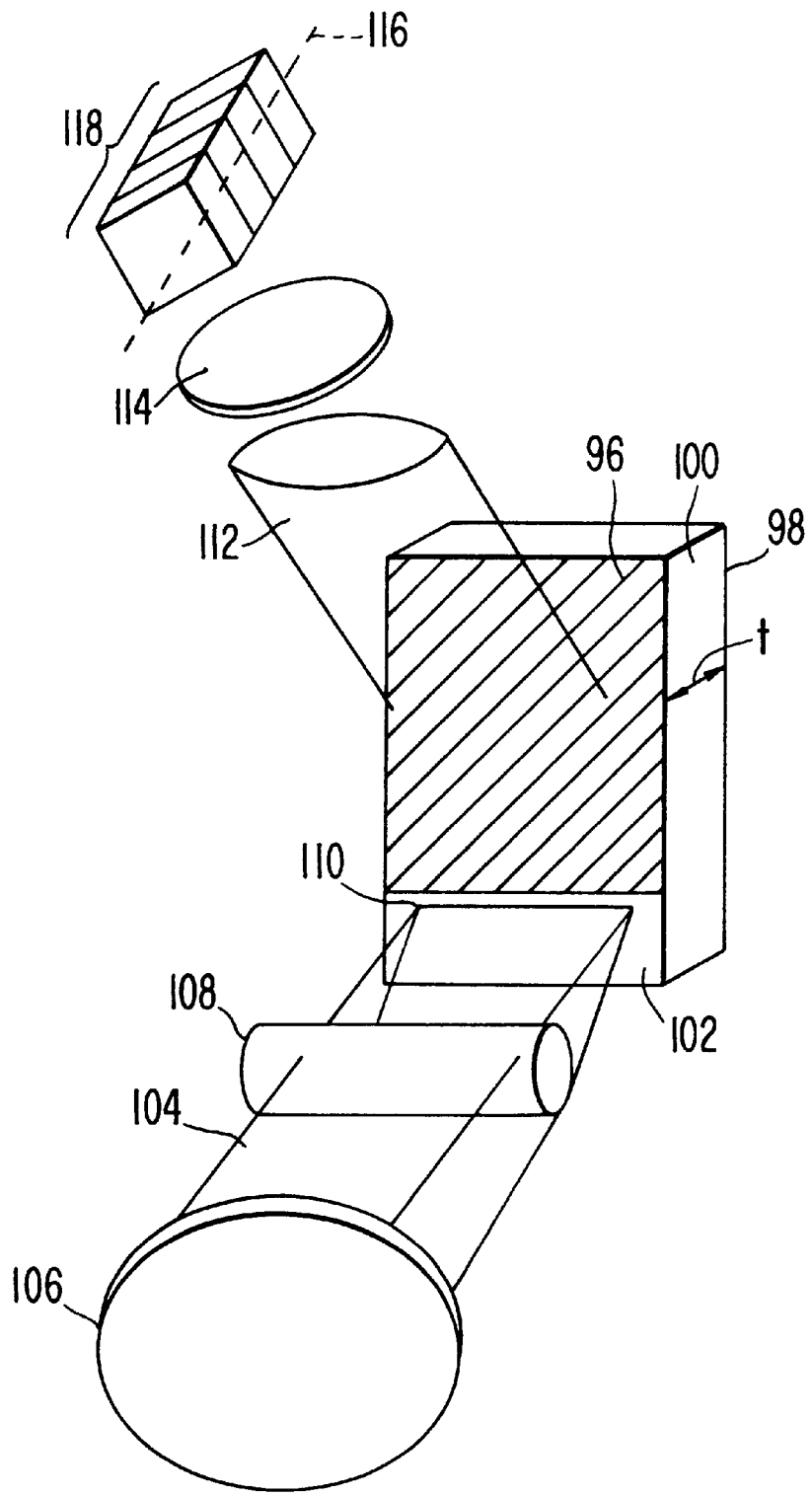
FIG. 11 is a diagram illustrating a wavelength splitter as used with a receiver, according to an embodiment of the present invention.

FIG. 11 is a diagram illustrating a wavelength splitter as used with a receiver, according to an embodiment of the present invention. Referring now to FIG. 11, multiple-layer reflecting films 96 and 98 are applied on both sides of a parallel plate 100 made of glass having a thickness, t, of, for example, 100 μm. It is preferable for parallel plate 100 to have a thickness in the range of 20 to 2000 μm. Reflecting films 96 and 98 are preferably multiple-layer, high-reflectance interference films.

The reflectance of reflecting film 98 is approximately 100%, and the reflectance of reflecting film 96 is approximately 95%. However, the reflectance of reflecting film 96 is not limited to 95% and can be a different value as long as enough light is reflected from reflecting film 96 to allow for multiple reflections between reflecting films 96 and 98. Preferably, the reflectance of reflecting film 96 is in the range of 80% to a few percentages less than 100%. Moreover, the reflectance of reflecting film 98 is not limited to 100%, but should be high enough to allow multiple reflections between reflecting films 96 and 98.

A radiation window 102 receives input light and is positioned on parallel plate 100 on the same surface as reflecting film 96. Radiation window 102 can be formed by a film having approximately 0% reflectance on the surface of parallel plate 100. As illustrated in FIG. 11, the boundary between radiation window 102 and reflecting film 96 is preferably a straight line.

The input light is output from, for example, an optical fiber (not illustrated) and received by a collimating lens 106. Collimating lens 106 converts the input light into parallel beams 104 which are received by a cylindrical lens 108. Cylindrical lens 108 focuses parallel beams 104 into a focal line 110 on radiation window 102. Focal line 110 is positioned close to and parallel with the straight line boundary between reflecting film 96 and radiation window 102. In this manner, input light enters parallel plate 100 via radiation window 102.

The optical axis of input light 102 is at a tilt angle with respect to the normal to reflecting film 96 so that input light will not escape through radiation window 102 after entering parallel plate 100. Thus, the tilt angle is set in accordance with Equation (2), above.

Once inside parallel plate 100, the input light experiences multiple reflection between reflecting films 96 and 98 (as illustrated, for example, in FIG. 7). Each time the input light is incident on reflecting film 96, approximately 95% of the light is reflected towards reflecting film 98 and approximately 5% of the light passes through reflecting film 96 to form an output light (such as, for example, output light Out1 illustrated in FIG. 7). Multiple reflections between reflecting films 96 and 98 cause a plurality of output lights to be formed. The plurality of output lights interfere with each other to form a luminous flux 112 having a propagation direction which depends on the wavelength of the input light.

Luminous flux 112 is then collected by a lens 114, which focuses luminous flux 112 at a collection point. The collection point moves along a straight line path 116 for different wavelengths of the input light. For example, as the wavelength of the input light increases, the collection point is moved farther along straight line path 116. A plurality of receivers 118 are arranged on straight line path 116 to receive the focused luminous flux 112. Therefore, each receiver 118 can be positioned to receive a luminous flux corresponding to a specific wavelength.

By controlling the distance t between the reflecting films or reflecting surfaces of the wavelength splitter, the phase difference of light reflected between the reflecting films or reflecting surfaces and can be shifted by a predetermined amount, thereby realizing excellent environmental resistance. Moreover, the above embodiments of the present invention experience only a small change in optical characteristics depending on the optical polarization.

Figure 12:
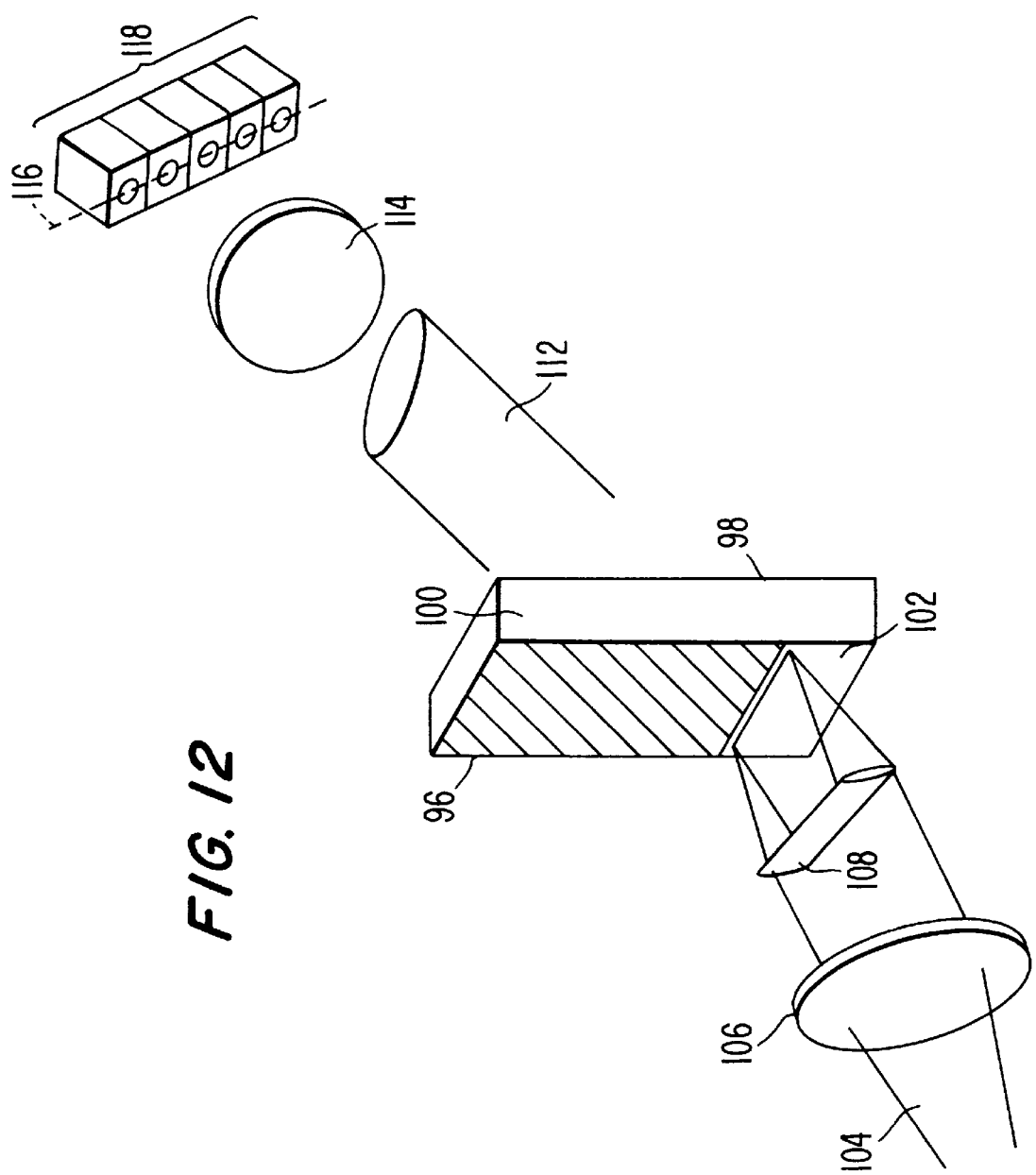
FIG. 12 is a diagram illustrating a wavelength splitter as used with a receiver, according to an additional embodiment of the present invention.

FIG. 12 is a diagram illustrating a wavelength splitter as used with a receiver, according to an additional embodiment of the present invention. The wavelength splitter illustrated in FIG. 12 is similar to the wavelength splitter illustrated in FIG. 11, except that the reflectances of reflecting films 96 and 98 are reversed. More specifically, in the wavelength splitter illustrated in FIG. 12, reflecting film 98 has a reflectance of approximately 95% and reflecting film 96 has a reflectance of approximately 100%. As illustrated in FIG. 12, luminous flux 112 is formed through interference of output light travelling through reflecting film 98. Thus, the input light enters one side of parallel plate 100, and luminous flux 112 is formed on the opposite side of parallel plate 100. Otherwise, the wavelength splitter illustrated in FIG. 12 operates in a similar manner as the wavelength splitter illustrated in FIG. 11.

Figure 13:
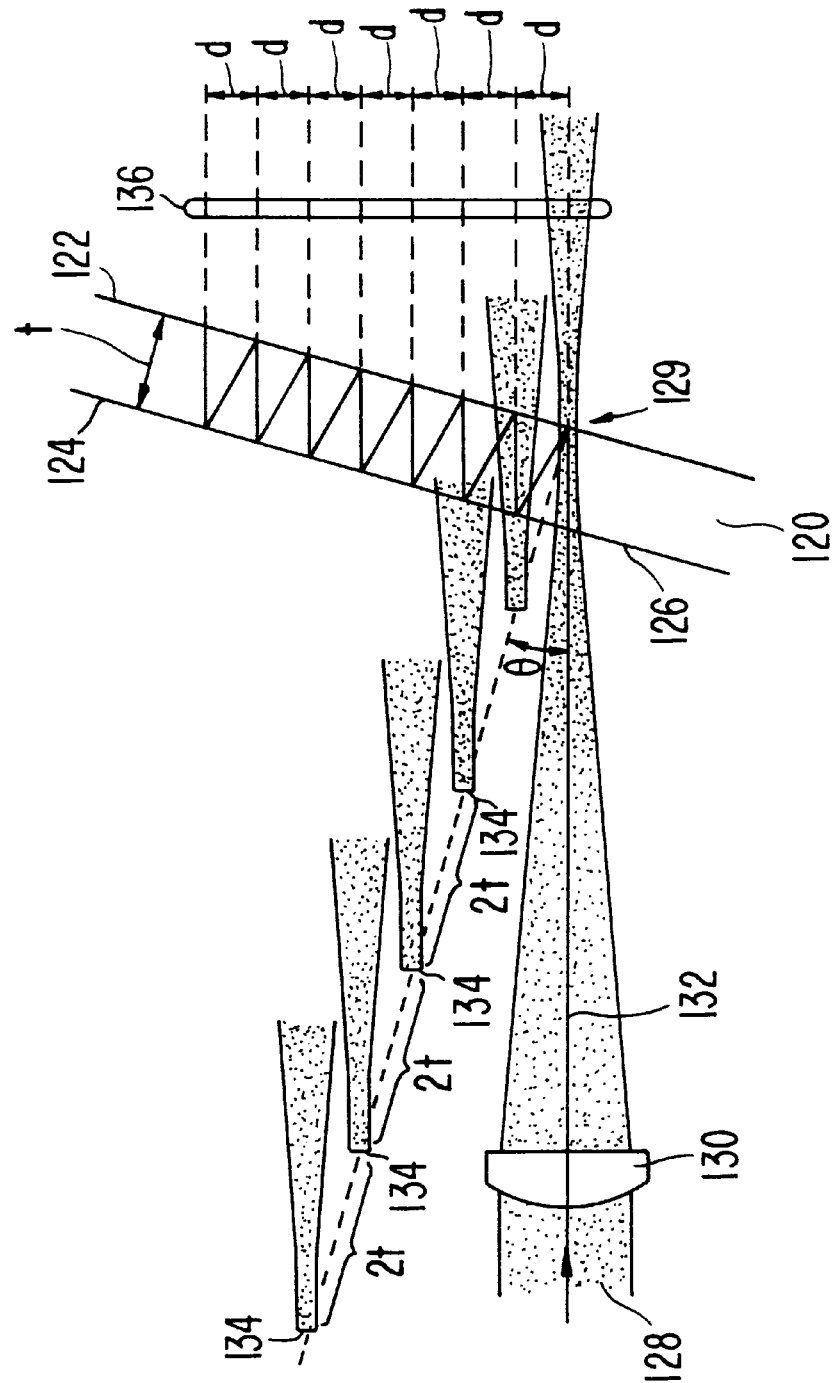
FIG. 13 is a diagram illustrating a wavelength splitter according to a further embodiment of the present invention.

FIG. 13 is a diagram illustrating a wavelength splitter according to a further embodiment of the present invention. Referring now to FIG. 13, a plate 120 made of, for example, glass, has reflecting films 122 and 124 thereon. Reflecting film 122 has a reflectance of approximately 95% or higher, but less than 100%. Reflecting film 124 has a reflectance of approximately 100%. A radiation window 126 has a reflectance of approximately 0% reflectance.

Input light 128 is focused into a focal line 129 by a cylindrical lens 130 through radiation window 126. Focal line 129 is on the surface of plate 120 to which reflecting film 122 is applied. Thus, focal line 129 is essentially line focused onto reflecting film 122 through radiation window 126. The width of focal line 129 can be referred to as the "beam waist" of input light 128 as focused by cylindrical lens 130. Thus, the embodiment of the present invention as illustrated is FIG. 13 focuses the beam waist of input light 128 onto the far surface (that is, the surface having reflecting film 122 thereon) of plate 120, whereas previously described embodiments of the present invention focused the beam waist onto the near surface (that is, for example, the surface having reflecting film 124 thereon in FIG. 13). By focusing the beam waist on the far surface of plate 120, the present embodiment of the present invention reduces the possibility of overlap between (i) the area of radiation window 126 on the surface of plate 120 covered by input light 128 as it travels through radiation window 126 (for example, the area "a" illustrated in FIG. 10), and (ii) the area on reflecting film 124 covered by input light 128 when input light 128 is reflected for the first time by reflecting film 124 (for example, the area "b" illustrated in FIG. 10). It is desirable to reduce such overlap to ensure proper operation of the wavelength splitter.

In FIG. 13, the optical axis 132 of input light 128 has a small tilt angle θ. Upon the first reflection off of reflecting film 122, 5% of the light passes through reflecting film 122 and diverges after the beam waist, and 95% of the light is reflected towards reflecting film 124. After being reflecting by reflecting film 124 for the first time, the light again hits reflecting film 122 but is displaced by an amount d. Then, 5% of the light passes through reflecting film 122. In a similar manner, as illustrated in FIG. 13, the light is split into many paths with a constant separation d. The beam shape in each path forms so that the light diverges from virtual images 134 of beam waist 129. Virtual images 134 are located with constant spacing 2t along a line that is normal to the plate, where t is the thickness of plate 120. The positions of the beam waists in virtual images 134 are self-aligned, and there is no need to adjust individual positions. Then, the lights diverging from virtual images 134 interfere with each other and form collimated light 136 which propagates in a direction that changes in accordance with the wavelength of input light 128.

The spacing of light paths is d=2tSinθ, and the difference in the path lengths between adjacent beams is 2tCosθ. The angular dispersion is proportional to the ratio of these two numbers, which is cotθ. As a result, the embodiments of the present invention produce a significantly larger angular dispersion between luminous fluxes for different carriers, as compared to conventional wavelength splitters.

As previously indicated, the terms "wavelength splitter" and "virtually imaged phased array" are used interchangeably herein to describe various embodiments of the present invention. As easily seen from FIG. 13, the term "virtually imaged phased array" arises from the formation of an array of virtual images 134.

Figure 14:
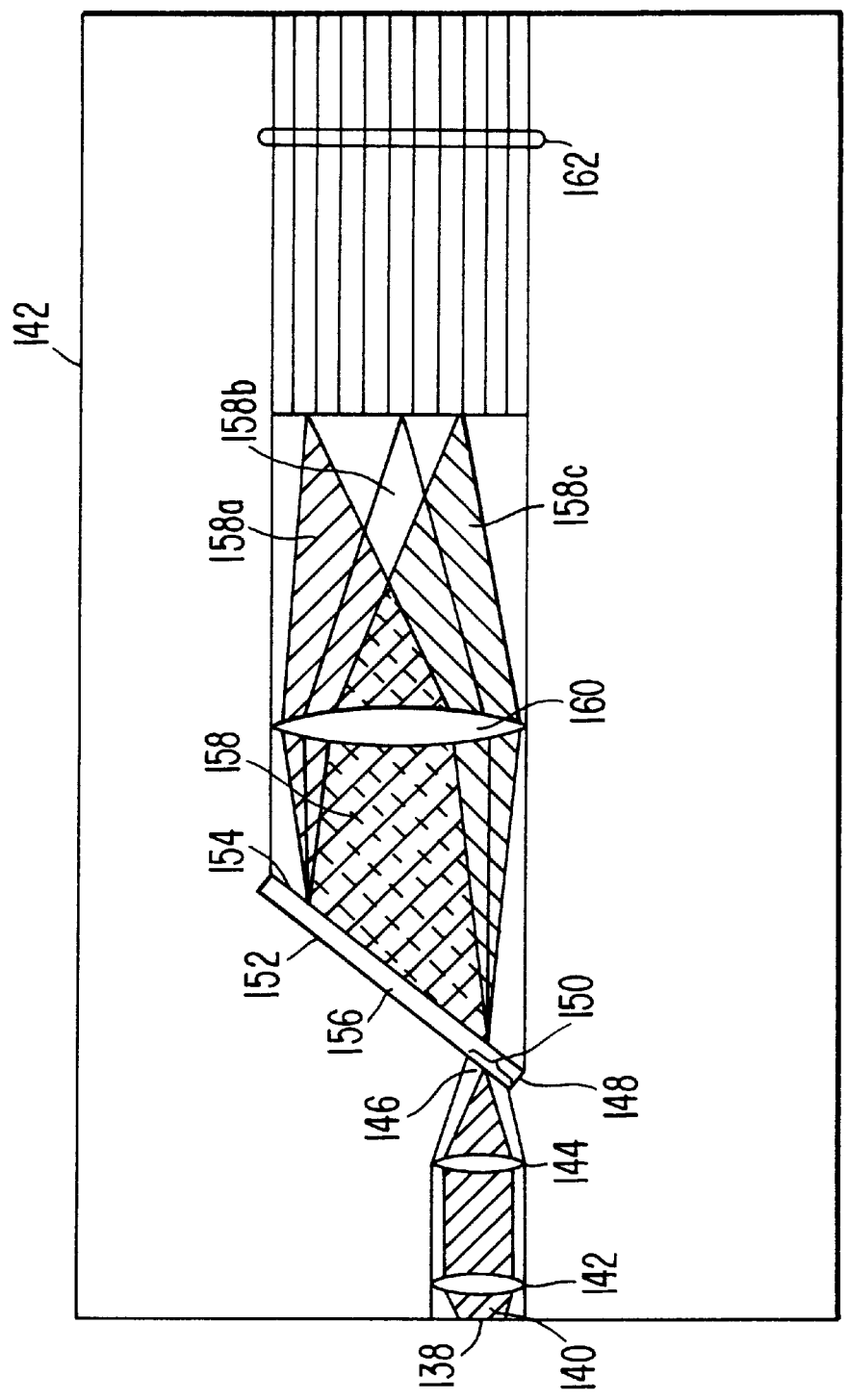
FIG. 14 is a diagram illustrating a waveguide type wavelength splitter, according to an embodiment of the present invention.

FIG. 14 is a diagram illustrating a waveguide type wavelength splitter, according to an embodiment of the present invention. Referring now to FIG. 14, light 138 is output from an optical fiber (not illustrated) and received by a waveguide 140 provided on a substrate 142. Waveguide 140 is, for example, lithium niobate. Light 138 contains optical signals modulated on a plurality of carriers having different wavelengths.

Light 138 typically has a dispersed width as it is output from the optical fiber. Therefore, a collimating lens 142 converts light 138 into parallel light. The parallel light is then collected by a cylindrical lens 144 and focused into a focal line 146. The light then radiates into a wavelength splitter 148 from focal line 146 through a radiation window 150.

Wavelength splitter 148 comprises reflecting films 152 and 154 on a parallel plate 156. Reflecting film 154 is on one side of a parallel plate 156, and reflecting film 152 and radiation window 150 are on the other side of parallel plate 156. Reflecting film 152 has a reflectance of approximately 100%, and reflecting film 154 has a reflectance of less than 100%. A luminous flux 158 of light reflected by parallel plate 156 is output to the side of parallel plate 156 opposite to radiation window 150.

If input light 138 includes a plurality of wavelengths, a plurality of luminous fluxes 158 will be formed which travel in different directions depending of the wavelengths of input light 138. Luminous flux 158 formed by wavelength splitter 148 is focused by a lens 160 at different points, depending on the propagation direction of luminous flux 158. Therefore, as illustrated in FIG. 14, luminous fluxes 158a, 158b and 158c having wavelengths λ1, λ2, and λ3, respectively, are formed at different collection points.

A plurality of receiving waveguides 162 are provided at the collection points. Each receiving waveguide 162 guides an optical signal and corresponding carrier having a single wavelength. Therefore, a plurality of luminous fluxes can be simultaneously received and transmitted through various channels. Each receiving waveguide 162 has a corresponding receiver (not illustrated) provided at a later stage. The receiver is typically a photodiode. Therefore, light guided by each receiving waveguides 162 is processed after being detected by the corresponding receiver.

FIGS. 15(A), 15(B), 15(C) and 15(D) are diagram illustrating a method for producing a wavelength splitter, according to an embodiment of the present invention.

Figure 15A:
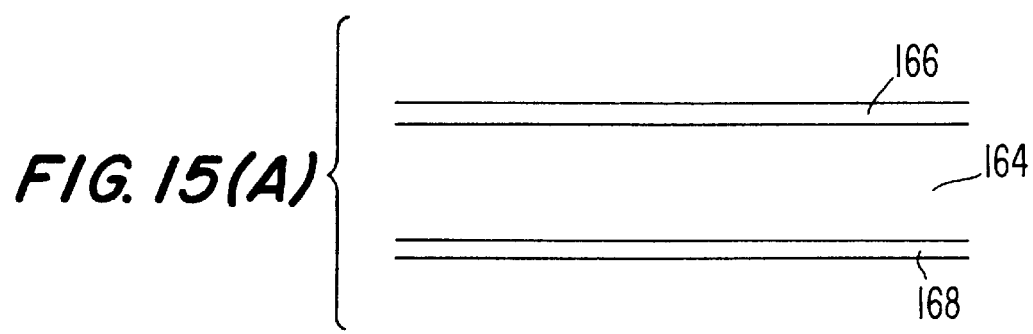
FIGS. 15(A), 15(B), 15(C) and 15(D) are diagrams illustrating a method for producing a wavelength splitter, according to an embodiment of the present invention.

Referring now to FIG. 15(A), a parallel plate 164 is preferably made of glass and exhibits excellent parallelism. Reflecting films 166 and 168 are formed on both sides of the parallel plate 164 by vacuum deposition, ion spattering or other such methods. One of reflecting films 166 and 168 has a reflectance of nearly 100%, and the other reflecting film has a reflectance of lower than 100%, and preferably higher than 80%.

Figure 15B:
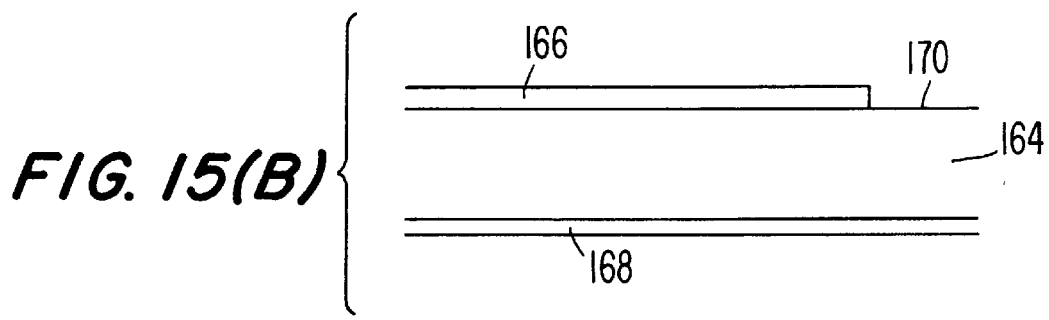

Referring now to FIG. 15(B), one of reflecting films 166 and 168 is partially shaved off to form a radiation window 170. In FIG. 15(B), reflecting film 166 is shown as being shaved off so that radiation window 170 can be formed on the same surface of parallel plate 164 as reflecting film 166. However, instead, reflecting film 168 can be partially shaved off so that a radiation window is formed on the same surface of parallel plate 164 as reflecting film 168. As illustrated by the various embodiment of the present invention, a radiation window can be on either side of parallel plate 164.

Shaving off a reflecting film can be performed by an etching process, but a mechanical shaving process can also be used and is less expensive. However, if a reflecting film is mechanically shaved, parallel plate 164 should be carefully processed to minimize damage to parallel plate 164. For example, if the portion of parallel plate 164 forming the radiation window is severely damaged, parallel plate 164 will generate excess loss caused by scattering of received input light.

Instead of first forming a reflecting film and then shaving it off, a radiation window can be produced by preliminarily masking a portion of parallel plate 164 corresponding to a radiation window, and then protecting this portion from being covered with reflecting film.

Figure 15C:
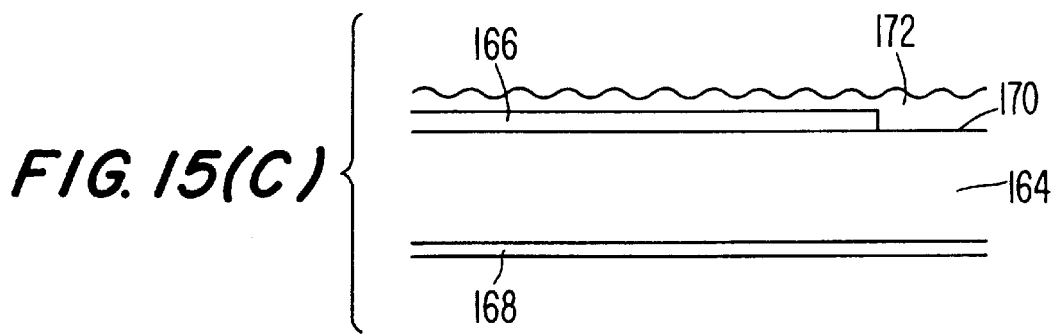
Figure 15D:
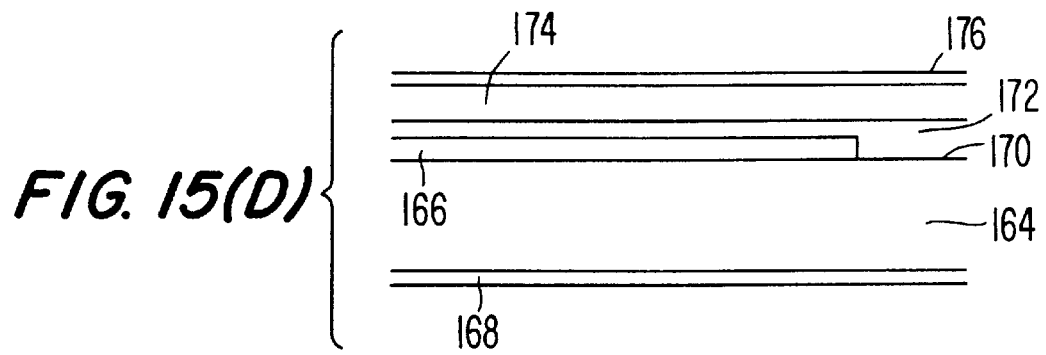

Referring now to FIG. 15(C), a transparent adhesive 172 is applied onto reflecting film 166 and the portion of parallel plate 164 from which reflecting film 166 has been removed. Transparent adhesive 172 should generate the smallest possible optical loss since it is also applied to the portion of parallel plate 164 forming a radiation window.

Referring now to FIG. 15 (D), a transparent protector plate 174 is applied onto transparent adhesive 172 to protect reflecting film 166 and parallel plate 164. Since transparent adhesive 172 is applied to fill the concave portion generated by removing reflecting film 166, transparent protector plate 174 can be provided in parallel with the top surface of parallel plate 164.

Similarly, to protect reflecting film 168, an adhesive (not illustrated) can be applied to the top surface of reflecting film 168 and should be provided with a protector plate (not illustrated). If reflecting film 168 has a reflectance of about 100%, and there is no radiation window on the same surface of parallel plate 164, then an adhesive and protector plate do not necessarily have to be transparent.

Furthermore, an anti-reflection film 176 can be applied on transparent protector plate 174. For example, transparent protector plate 174 and radiation window 170 can be covered with anti-reflection film 176.

According to the above embodiments of the present invention, a focal line is described as being on the surface of a radiation window or on the opposite surface of a parallel plate from which input light enters. However, the focal line can be in the parallel plate, or before the radiation window.

According to the above embodiments of the present invention, two reflecting films reflect light therebetween, with the reflectance of one reflecting film being approximately 100%. However, a similar effect can be obtained with two reflecting films each having a reflectance of less than 100%. For example, both reflecting films can have a reflectance of 95%. In this case, each reflecting film has light travelling therethrough and causing interference. As a result, a luminous flux traveling in the direction depending on the wavelength is formed on both sides of the parallel plate on which the reflecting films are formed. Thus, the various reflectances of the various embodiments of the present invention can easily be changed in accordance with required characteristics of a wavelength splitter.

According to the above embodiments of the present invention, a waveguide splitter is described as being formed by a parallel plate, or by two reflecting surfaces in parallel with each other. However, the plate or reflecting surfaces do not necessarily have to be parallel.

According to the above embodiments of the present invention, a light which includes a plurality of wavelengths can be simultaneously divided. Therefore, a receiver for use in wavelength multiplexing communications can be successfully reduced in size.

According to the above embodiments of the present invention, a wavelength splitter can simultaneously split a wavelength multiplexed light for each wavelength of input light. Moreover, the angle of dispersion can be adjusted by the thickness t of the parallel plate forming the wavelength splitter. As a result, the angle of dispersion can be made large enough to allow a receiver to easily receive each split signal. For example, a conventional diffraction grating requires a fine concavo-convex surface for a large angle of dispersion. However, it is very difficult to prepare a fine and precise concavo-convex surface, thereby limiting the size of the angle of dispersion. By contrast, a wavelength splitter according to the above embodiments of the present invention only requires a change in thickness of the parallel plate to realize a relatively large angle of dispersion.

Moreover, a wavelength splitter according to the above embodiments of the present invention produces a larger angle of dispersion than a conventional diffraction grating. Therefore, a receiver which uses a wavelength splitter according to the above embodiments of the present invention can correctly receive an optical signal, without fail, even in wavelength multiplexing communications realizing high-level multiplexing processes. Furthermore, such a receiver has a relatively simple construction and is relatively inexpensive to produce.

According to the above embodiments of the present invention, a wavelength splitter uses multiple-reflection and maintains a constant phase difference between interfering lights. As a result, the characteristics of the wavelength splitter are stable, thereby reducing optical characteristic changes causes by polarization. By contrast, the optical characteristics of a conventional diffraction grating experience undesirable changes in dependance on the polarization of the input light.

Moreover, as compared to an array waveguide grating, a wavelength splitter according to the above embodiments of the present invention requires a relatively simple configuration and achieves stable optical characteristics and resistance to changes in environmental conditions.

The above embodiments of the present invention as described as providing luminous fluxes which are "spatially distinguishable" from each other. "Spatially distinguishable" refers to the luminous fluxes being distinguishable in space. For example, various luminous fluxes are spatially distinguishable if they are collimated and travel in different directions, or are focused in different locations. However, the present invention is not intended to be limited to these precise examples, and there are many other ways in which luminous fluxes can be spatially distinguished from each other.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a lens line focusing an input light having a respective wavelength within a continuous range of wavelengths; and
   a multiple reflection device which receives the line focused input light, and causes multiple reflection of the input light that splits the input light into a plurality of light beams which produce self-interference of the input light that forms an output light, wherein the output light is spatially distinguishable from an output light formed for an input light having any other wavelength within the continuous range of wavelengths.

2. An apparatus as in claim 1, wherein the multiple reflection device further comprises:
   first and second surfaces spaced apart from each other, the multiple reflection of the input light occurring between the first and second surfaces.

3. An apparatus as in claim 2, wherein the second surface has a reflectivity which allows a portion of the input light to pass therethrough each time the input light reflects off the second surface during the multiple reflection of the input light, thereby causing a plurality of transmitted lights to pass through the second surface, the plurality of transmitted lights being said plurality of light beams and interfering with each other to provide the self interference of the input light and form the output light.

4. An apparatus as in claim 3, wherein the multiple reflection device further comprises:
   a glass material, the first and second surfaces being on the glass material with the glass material positioned between first and second surfaces, the multiple reflection of the input light occurring in the glass material and between the first and second surfaces.

5. An apparatus as in claim 4, wherein the multiple reflection device includes a window which is at least partially transparent and is formed on the glass material, the input light travelling through the window and entering the glass material to be reflected between the first and second surfaces.

6. An apparatus as in claim 3, further comprising:
   a collecting lens for collecting the output light; and
   one of the group consisting of an optical receiver and an optical transmission line, for receiving the collected output light from the collecting lens.

7. An apparatus as in claim 3, wherein the line focused input light radiates from a line focused position to be received between the first and second surfaces of the multiple reflection device and reflected between the first and second surfaces.

8. An apparatus as in claim 3, wherein each of the plurality of transmitted lights interfere with each of the other transmitted lights, to provide the self interference of the input light and form the output light.

9. An apparatus as in claim 1, wherein the input light comprises at least two lights which each are at a different wavelength, and the multiple reflection device forms a respective output light for each light of the input light, each output light being spatially distinguishable from the other output lights.

10. An apparatus as in claim 9, wherein each output light propagates in a different direction than each of the other output lights, to thereby be spatially distinguishable.

11. An apparatus as in claim 1, wherein the input light is a wavelength division multiplexed light comprising a plurality of carriers, and the multiple reflection device forms a respective output light for each carrier of the input light, each output light being spatially distinguishable from the other output lights.

12. An apparatus as in claim 11, wherein the multiple reflection device further comprises:
    first and second surfaces spaced apart from each other, the multiple reflection of the input light occurring between the first and second surfaces, wherein the second surface has a reflectivity which allows a portion of the input light to pass therethrough each time the input light reflects off the second surface during the multiple reflection of the input light, thereby causing a plurality of transmitted lights to pass through the second surface, the plurality of transmitted lights interfering with each other to provide the self interference of the input light and form a respective output light for each carrier of the input light.

13. An apparatus as in claim 12, wherein each of the plurality of transmitted lights interfere with each of the other transmitted lights, to provide the self interference of the input light and form the output light.

14. An apparatus receiving a line focused input light and producing a spatially distinguishable output light, the apparatus comprising:
    a transparent material having first and second surfaces thereon, the second surface having a reflectivity which allows a portion of light incident thereon to be transmitted therethrough, the line focused input light being reflected a plurality of times in the transparent material between the first and second surfaces to cause a plurality of lights to be transmitted through the second surface, the plurality of transmitted lights interfering with each other to produce the output light,
    wherein the input light is at a respective wavelength within a continuous range of wavelengths and the output light is spatially distinguishable from an output light formed for an input light having any other wavelength within the continuous range of wavelengths.

15. An apparatus as in claim 14, wherein the first and second surfaces are parallel with each other.

16. An apparatus as in claim 14, wherein the reflectance of the first surface is substantially 100%.

17. An apparatus as in claim 16, wherein the reflectance of the second surface is greater than 80% and less than 100%.

18. An apparatus as in claim 14, wherein the reflectance of the second surface is greater than 80% and less than 100%.

19. An apparatus as in claim 14, further comprising a window which is at least partially transparent and is formed on the transparent material, the input light passing through the window to enter the transparent material and be reflected between the first and second surfaces.

20. An apparatus as in claim 19, wherein the window is formed on the transparent material and in the same plane as one of the first and second surfaces.

21. An apparatus as in claim 19, wherein the input light enters through the window at an angle which prevents the input light from exiting the through the window while being reflected between the first and second surfaces.

22. An apparatus as in claim 14, wherein the input light comprises at least two lights which each are at a different wavelength, and the plurality of transmitted lights interfere with each other to produce a respective output light for each light of the input light, each output light being spatially distinguishable from the other output lights.

23. An apparatus as in claim 14, wherein the input light is a wavelength division multiplexed light comprising at least two carriers which each are at a different wavelength, and the plurality of transmitted lights interfere with each other to produce a respective output light for each carrier of the input light, each output light being spatially distinguishable from the other output lights.

24. An apparatus as in claim 23, wherein each output light propagates in a different direction than each of the other output lights, to thereby be spatially distinguishable.

25. An apparatus as in claim 14, wherein each of the plurality of transmitted lights interfere with each of the other transmitted lights, to produce the output light.

26. An apparatus receiving a line focused wavelength division multiplexed light comprising at least two carriers, and producing a spatially distinguishable output light for each carrier, the apparatus comprising:

a transparent material having first and second surfaces thereon, the second surface having a reflectivity which allows a portion of light incident thereon to be transmitted therethrough, the line focused wavelength division multiplexed light being reflected a plurality of times in the transparent material between the first and second surfaces to cause a plurality of lights to be transmitted through the second surface, the plurality of transmitted lights interfering with each other to produce a respective output light for each carrier of the wavelength division multiplexed light, wherein each carrier is at a respective wavelength within a continuous range of wavelengths and the output light formed for a respective carrier is spatially distinguishable from an output light formed for a carrier having any other wavelength within the continuous range of wavelengths.

27. An apparatus as in claim 26, wherein each of the plurality of transmitted lights interfere with each of the other transmitted lights, to produce the output lights.

28. A method comprising the steps of:

forming a first reflecting film on a first surface of a transparent material; and forming a second reflecting film on a second surface of the transparent material to allow a line focused input light to be reflected a plurality of times in the transparent material between the first and second reflecting films, the second reflecting film having a reflectance which is less than the reflectance of the first reflecting film and allowing a portion of the input light to pass therethrough each time the input light reflects off the second reflecting film to cause a plurality of transmitted lights to pass through the second reflecting film, the first and second reflecting films being positioned so that the plurality of transmitted lights interfere with each other to provide self interference of the input light and thereby form an output light which is spatially distinguishable from an output light formed for an input light having any other wavelength within the continuous range of wavelengths.

29. A method as in claim 28, further comprising the step of:

forming a window which is at least partially transparent on the transparent material and in the same plane as one of the first and second reflecting films, so that the input light can pass through the window to be received in the transparent material and reflected between the first and second reflecting films.

30. A method as in claim 29, wherein the step of forming the window comprising:

forming the window by shaving off a portion of the reflecting film which is in the same plane as the window.

31. A method as in claim 29, wherein the step of forming the window comprising:

forming the window by etching off a portion of the reflecting film which is in the same plane as the window.

32. A method as in claim 29, wherein the step of forming the window comprises:

forming the window on a portion of the transparent material by using a masking process to prevent the reflecting film in the same plane as the window from being formed on the portion of the transparent material.

33. A method as in claim 29, wherein the first and second surfaces are parallel to each other.

34. An apparatus comprising:

a multiple reflection device which receives an input light having a respective wavelength within a continuous range of wavelengths, and causes multiple reflection of the input light to produce self-interference that forms an output light, wherein the output light is spatially distinguishable from an output light formed for an input light having any other wavelength within the continuous range of wavelengths, wherein the multiple reflection device comprises first and second surfaces spaced apart from each other, the multiple reflection of the input light occurring between the first and second surfaces, the second surface has a reflectivity which allows a portion of the input light to pass therethrough each time the input light reflects off the second surface during the multiple reflection of the input light, thereby causing a plurality of transmitted lights to pass through the second surface, the plurality of transmitted lights interfering with each other to provide the self interference of the input light and form the output light, and the apparatus further comprises a lens for focusing the input light into a line, the input light radiating from the line to be received between the first and second surfaces of the multiple reflection device and reflected between the first and second surfaces.

35. An apparatus comprising:

a multiple reflection device which receives an input light having a respective wavelength within a continuous range of wavelengths, and causes multiple reflection of the input light to produce self-interference that forms an output light, the output light being spatially distinguishable from an output light formed for an input light having any other wavelength within the continuous range of wavelengths, wherein the multiple reflection device comprises first and second surfaces spaced apart from each other, the multiple reflection of the input light occurring between the first and second surfaces, the second surface has a reflectivity which allows a portion of the input light to pass therethrough each time the input light reflects off the second surface during the multiple reflection of the input light, thereby causing a plurality of transmitted lights to pass through the second surface, the plurality of transmitted lights interfering with each other to provide the self interference of the input light and form the output light, the multiple reflection device further comprises a glass material, the first and second surfaces being on the glass material with the glass material positioned between the first and second surfaces, the multiple reflection of the input light occurring in the glass material and between the first and second surfaces, the apparatus further comprises a lens for focusing the input light into a line, and the multiple reflection device includes a window which is at least partially transparent and is formed on the glass material, the input light radiating from the line and then travelling through the window and enter the glass material to be reflected between the first and second surfaces.

36. An apparatus for receiving an input light and producing a spatially distinguishable output light, the apparatus comprising:

a transparent material having first and second surfaces thereon, the second surface having a reflectivity which allows a portion of light incident thereon to be transmitted therethrough, the input light being reflected a plurality of times in the transparent material between the first and second surfaces to cause a plurality of lights to be transmitted through the second surface, the plurality of transmitted lights interfering with each other to produce the output light, wherein the input light is at a respective wavelength within a continuous range of wavelengths and the output light is spatially distinguishable from an output light formed for an input light having any other wavelength within the continuous range of wavelengths, the input light is a wavelength division multiplexed light comprising at least two carriers which each are at a different wavelength, and the plurality of transmitted lights interfere with each other to produce a respective output light for each carrier of the input light, each output light being spatially distinguishable from the other output lights, and each output light propagates in a different direction than each of the other output lights, to thereby be spatially distinguishable.

37. An apparatus comprising:

first and second surfaces, the second surface having a reflectivity which causes a portion of light incident thereon to be transmitted therethrough, wherein an input light at a respective wavelength is focused into a line, and the first and second surfaces are positioned so that the input light radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength.

38. An apparatus as in claim 37, wherein the input light comprises at least two lights which each are at a different wavelength, and the apparatus produces a respective output light for each light of the input light, each output light being spatially distinguishable from the other output lights.

39. An apparatus as in claim 38, wherein each output light propagates in a different direction than each of the other output lights, to thereby be spatially distinguishable.

40. An apparatus comprising:

first and second surfaces, the second surface having a reflectivity which causes a portion of light incident thereon to be transmitted therethrough, wherein an input light at a respective wavelength is focused into a line, and the first and second surfaces are positioned so that the input light radiates from the line to be reflected a plurality of times between the first and second surfaces and thereby cause a plurality of lights to be transmitted through the second surface, each transmitted light interfering with each of the other transmitted lights to produce an output light which is spatially distinguishable from an output light produced for an input light at a different wavelength.

41. An apparatus as in claim 40, wherein the input light comprises at least two lights which each are at a different wavelength, and the apparatus produces a respective output light for each light of the input light, each output light being spatially distinguishable from the other output lights.

42. An apparatus as in claim 41, wherein each output light propagates in a different direction than each of the other output lights, to thereby be spatially distinguishable.

43. An apparatus for receiving a line focused input light and producing a spatially distinguishable output light, the apparatus comprising:

first and second surfaces, the second surface having a reflectivity which allows a portion of light incident thereon to be transmitted therethrough, the first and second surfaces being positioned so that the line focused input light is reflected a plurality of times between the first and second surfaces to cause a plurality of lights to be transmitted through the second surface, the plurality of transmitted lights interfering with each other to produce the output light, wherein the input light is at a respective wavelength within a continuous range of wavelengths and the output light is spatially distinguishable from an output light formed for an input light having any other wavelength within the continuous range of wavelengths.

44. An apparatus receiving an input light at a respective wavelength and focused into a line, the apparatus comprising:

first and second surfaces spaced apart from each other; and means for causing the input light to radiate from the line to be reflected a plurality of times between the first and second surfaces and thereby cause a plurality of lights to be transmitted through the second surface, and for causing the transmitted lights to interfere with each other to produce an output light which is spatially distinguishable from an output light produced for an input light at a different wavelength.

45. An apparatus receiving a line focused input light at a respective wavelength within a continuous range of wavelengths, the apparatus comprising:

first and second surfaces spaced apart from each other, and means for causing the line focused input light to be reflected a plurality of times between the first and second surfaces so that a plurality of lights are transmitted through the second surface, and for causing the plurality of transmitted lights to interfere with each other to produce an output light which is spatially distinguishable from an output light formed for an input light having any other wavelength within the continuous range of wavelengths.

46. An apparatus comprising:
a multiple reflection device which receives an input light having a respective wavelength within a continuous range of wavelengths, and causes multiple reflection of the input light that splits the input light into a plurality of light beams which produce self-interference of the input light that forms an output light, wherein the output light is spatially distinguishable from an output light formed for an input light having any other wavelength within the continuous range of wavelengths, wherein the multiple reflection device further comprises
first and second surfaces spaced apart from each other, the multiple reflection of the input light occurring between the first and second surfaces, the second surface has a reflectivity which allows a portion of the input light to pass therethrough each time the input light reflects off the second surface during the multiple reflection of the input light, thereby causing a plurality of transmitted lights to pass through the second surface, the plurality of transmitted lights being said plurality of light beams and interfering with each other to provide the self interference of the input light and form the output light, and the apparatus further comprises a lens for focusing the input light into a line, the input light radiating from the line to be received between the first and second surfaces of the multiple reflection device and reflected between the first and second surfaces.

47. An apparatus comprising:
a multiple reflection device which receives an input light having a respective wavelength within a continuous range of wavelengths, and causes multiple reflection of the input light that splits the input light into a plurality of light beams which produce self-interference of the input light that forms an output light, wherein the output light is spatially distinguishable from an output light formed for an input light having any other wavelength within the continuous range of wavelengths, wherein the multiple reflection device further comprises
first and second surfaces spaced apart from each other, the multiple reflection of the input light occurring between the first and second surfaces, the second surface has a reflectivity which allows a portion of the input light to pass therethrough each time the input light reflects off the second surface during the multiple reflection of the input light, thereby causing a plurality of transmitted lights to pass through the second surface, the plurality of transmitted lights being said plurality of light beams and interfering with each other to provide the self interference of the input light and form the output light, the multiple reflection device further comprises a glass material, the first and second surfaces being on the glass material with the glass material positioned between the first and second surfaces, the multiple reflection of the input light occurring in the glass material and between the first and second surfaces, the apparatus further comprises a lens for focusing the input light into a line, and the multiple reflection device includes a window which is at least partially transparent and is formed on the glass material, the input light radiating from the line and then travelling through the window and entering the glass material to be reflected between the first and second surfaces.

48. An apparatus for receiving an input light and producing a spatially distinguishable output light, the apparatus comprising:
a transparent material having first and second surfaces thereon, the second surface having a reflectivity which allows a portion of light incident thereon to be transmitted therethrough, the input light being reflected a plurality of times in the transparent material between the first and second surfaces to cause a plurality of lights to be transmitted through the second surface, the plurality of transmitted lights interfering with each other to produce the output light, wherein the input light is at a respective wavelength within a continuous range of wavelengths and the output light is spatially distinguishable from an output light formed for an input light having any other wavelength within the continuous range of wavelengths, wherein the input light is a wavelength division multiplexed light comprising at least two carriers which each are at a different wavelength, and the plurality of transmitted lights interfere with each other to produce a respective output light for each carrier of the input light, each output light being spatially distinguishable from the other output lights, and each output light propagates in a different direction than each of the other output lights, to thereby be spatially distinguishable.

49. An apparatus comprising:
first and second reflecting surfaces, the second reflecting surface having a reflectivity which causes a portion of light incident thereon to be transmitted therethrough, wherein an input light at a respective wavelength is focused into a line, and the first and second reflecting surfaces are positioned so that the input light radiates from the line to be reflected a plurality of times between the first and second reflecting surfaces and thereby cause a plurality of lights to be transmitted through the second reflecting surface, the plurality of transmitted lights interfering with each other to produce an output light which is spatially distinguishable from an output light produced for an input light at a different wavelength.

50. An apparatus as in claim 49, wherein the input light comprises at least two lights which each are at a different wavelength, and the apparatus produces a respective output light for each light of the input light, each output light being spatially distinguishable from the other output lights.

51. An apparatus as in claim 50, wherein each output light propagates in a different direction than each of the other output lights, to thereby be spatially distinguishable.

52. An apparatus comprising:
first and second reflecting surfaces, the second reflecting surface having a reflectivity which causes a portion of light incident thereon to be transmitted therethrough, wherein an input light at a respective wavelength is focused into a line, and the first and second reflecting surfaces are positioned so that the input light radiates from the line to be reflected a plurality of times between the first and second reflecting surfaces and thereby cause a plurality of lights to be transmitted through the second reflecting surface, each transmitted light interfering with each of the other transmitted lights to produce an output light which is spatially distinguishable from an output light produced for an input light at a different wavelength.

53. An apparatus as in claim 52, wherein the input light comprises at least two lights which each are at a different wavelength, and the apparatus produces a respective output light for each light of the input light, each output light being spatially distinguishable from the other output lights.

54. An apparatus as in claim 53, wherein each output light propagates in a different direction than each of the other output lights, to thereby be spatially distinguishable.

55. An apparatus for receiving an input light and producing a spatially distinguishable output light, the apparatus comprising:

first and second reflecting surfaces, the second reflecting surface having a reflectivity which allows a portion of light incident thereon to be transmitted therethrough, the first and second reflecting surfaces being positioned so that the input light reflects a plurality of times between the first and second reflecting surfaces to cause a plurality of lights to be transmitted through the second reflecting surface, the plurality of transmitted lights interfering with each other to produce the output light, wherein the input light is at a respective wavelength within a continuous range of wavelengths and the output light is spatially distinguishable from an output light formed for an input light having any other wavelength within the continuous range of wavelengths, the input light is a wavelength division multiplexed light comprising at least two carriers which each are at a different wavelength, and the plurality of transmitted lights interfere with each other to produce a respective output light for each carrier of the input light, each output light being spatially distinguishable from the other output lights, and each output light propagates in a different direction than each of the other output lights, to thereby be spatially distinguishable.

56. An apparatus comprising:

first and second reflecting surfaces, the second reflecting surface having a reflectivity which allows a portion of light incident thereon to be transmitted therethrough, the first and second reflecting surfaces being positioned so that a wavelength division multiplexed (WDM) light including first and second carriers is received between the first and second reflecting surfaces and reflected a plurality of times between the first and second reflecting surfaces to cause a plurality of lights to be transmitted through the second reflecting surface, the plurality of transmitted lights interfering with each other to produce first and second output lights for the first and second carriers, respectively, the first and second output lights propagating in different directions.

57. An apparatus as in claim 56, wherein the WDM light is line focused between the first and second reflecting surfaces, to thereby be received between the first and second reflecting surfaces.

* * * * *